L. S. ROBBINS,
Assignor to THE AMERICAN VULCANIZING WOOD AND LUMBER CO.
Preserving Wood.
No. 9,512. Reissued Dec. 21, 1880.
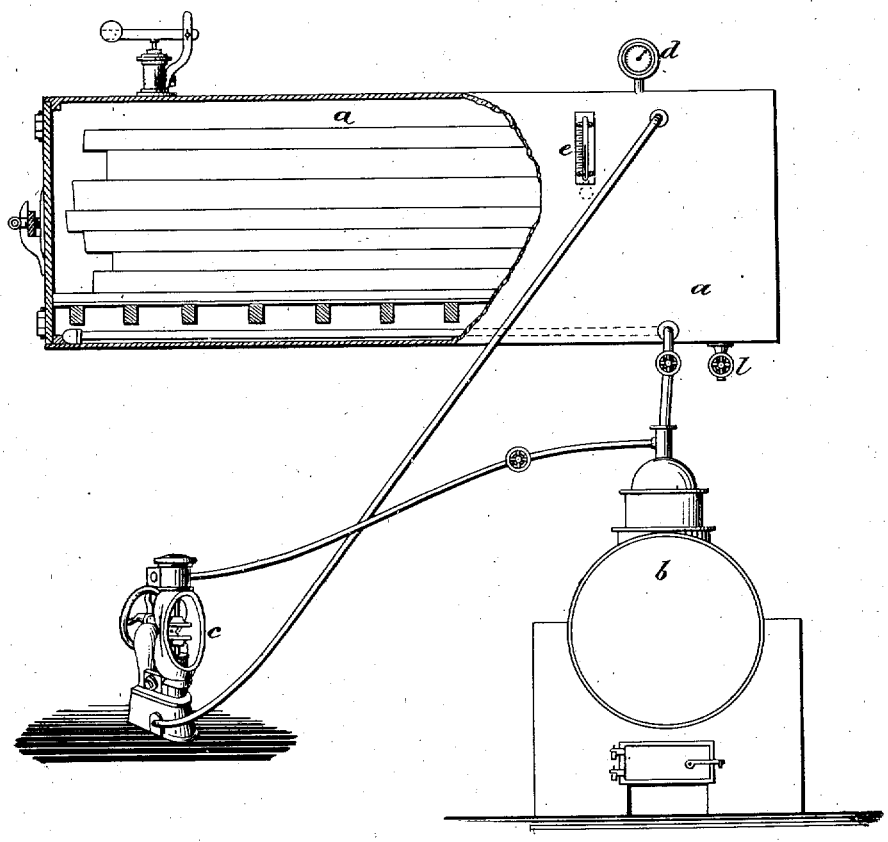
Witnesses:
Geo. H. Miatt
A. Greef Jr.
Inventor:
Louis S. Robbins,
By his Attorney
E. N. Dickerson Jr.

UNITED STATES PATENT OFFICE.

LOUIS S. ROBBINS, OF NEW YORK, N. Y., ASSIGNOR TO THE AMERICAN VULCANIZING WOOD AND LUMBER COMPANY, OF SAME PLACE.

PRESERVING WOOD.

SPECIFICATION forming part of Reissued Letters Patent No. 9,512, dated December 21, 1880.

Original No. 165,758, dated July 20, 1875. Application for reissue filed February 20, 1880.

*To all whom it may concern:*

Be it known that I, LOUIS S. ROBBINS, of the city and county of New York, in the State of New York, have invented a new and useful Improvement in Preserving Wood, of which the following is a full, true, and exact description, reference being had to the accompanying drawing, making part of this specification.

In the usual processes hitherto employed in preserving wood the main object has been to drive out of the wood its fluid matter or sap. In kiln-drying, for instance, wood is placed in a chamber subjected to heat, and by a slow process of distillation or evaporation the sap or fluid matter is expelled from the wood. By this treatment the wood loses much of its life and strength, the fiber is rendered brittle, and the depleted pores readily absorb moisture; then the wood swells, and when the moisture is expelled the wood shrinks; and the wood thus treated continues swelling and shrinking alternately, according to its exposure; but the treatment of wood most approved and generally employed is the slow process of desiccation by exposing it for some time in the open air, usually for several seasons, and hence called "seasoning." The sap or fluid matter (which in its natural state is highly soluble with water) is dissolved by the moisture of the atmosphere, and when thus diluted is more readily evaporated. That much of the fluid matter has been dissolved and expelled from wood which has been thus exposed for some time is shown by its loss in weight and measurement, and on the outside it appears perfectly dry; but when the wood is subjected to the plane and the outside taken off and a new surface presented, the fresh fluid matter not before exposed will in like manner be dissolved, diluted, and evaporated by the action of the atmosphere, and the wood, from the loss of it, will again shrink. It is also true that wood, however well treated by these processes, is liable to decay, its exposure to heat and moisture producing fermentation, which, if not arrested, results in decomposition.

I am aware that there are various methods of preserving wood by injecting into the depleted pores foreign substances antiseptic in their nature, which will prevent fermentation and putrefaction by coagulating the albuminous elements of the sap. But in all these processes the machinery is complicated, the material employed expensive, and when of a metallic nature, as is generally the case, it renders the wood brittle. By my process I do not drain the fluid matter or sap out of the wood, but retain and utilize it in the wood, as the most natural and best filling for the pores or cells and cement for the fiber, and this is accomplished by the use of heat and pressure.

It is well known that the degree of heat necessary to create ebullition in a liquid depends upon the amount of atmospheric or gaseous pressure upon its surface—the greater the pressure the higher the temperature required to reach the boiling-point. It is also well known that by heat chemical changes can be produced in nearly all substances. I have utilized this principle in my improved process, which consists in putting upon the wood an artificial pressure, atmospheric or gaseous, so as to prevent ebullition and consequent evaporation of the fluid or liquid matter, while at the same time the wood is subjected to a temperature sufficiently high to effect a chemical change in the substances of which the sap is composed. By the increased pressure vaporization of the sap is prevented, while the vaporizable melted products are diffused with great uniformity throughout the wood, and are coagulated, solidified, and fixed, and hence retained in the wood, filling the pores and cementing the fibers together, and the tendency of the vegetable juices and liquid matters to fermentation and consequent decay is checked by the change or curing effect produced in them by the high heat.

In carrying out my process of preparing wood any suitable apparatus may be employed; but I have shown in the drawing means that can be used.

The chamber *a* is adapted to receive the wood, and it will be of a size suitable to the material to be operated upon. It is generally provided with a track in the bottom, with a car onto which the wood is piled, which car may be run into the chamber *a* and the end closed by a suitable head or doors. The boiler *b* is connected to coils of steam-pipes within the chamber *a*, so that the temperature of such chamber *a* may be raised to any desired degree of heat. Hot water may take the place of steam, or heated air may be introduced. An air-pump, *c*, is employed to force air into the chamber or receiver *a*. A pressure-gage, *d*, and a thermometer, *e*, should also be provided.

The wood, having been placed in the curing-chamber, is then subjected to heat and to a pressure of air or gas forced into the chamber. The pressure may be raised to a point equal to one pound for each degree above 212° Fahrenheit, or thereabout, to which the temperature of the wood is raised; but it must be raised to a point sufficient to prevent the evaporation when the wood is heated to its highest point. By this means the evaporation of the juices—resinous and watery matters from the wood—is prevented, and the resinous matters are also dispersed with considerable uniformity throughout the wood, so as to fill up its pores. These resinous matters are confined by the increased pressure, and solidify with the wood and render it very dense. The vegetable albumen is also solidified, and the result of the treatment is a very dry, uniform, and hard wood, free from sap and other matters that would hasten its destruction by fermentation. This heating operation tends to destroy insects and germs that might destroy the wood or injure the same. This operation may properly be termed "vulcanizing wood." At the end of the operation the pressure and temperature are gradually and simultaneously decreased.

In subjecting wood to the combined action of heat and gaseous pressure, as before explained, it is preferable to raise the temperature in the receiver till the vapors begin to distil—about 212° Fahrenheit—so as to expel the atmosphere from the pores, and then to set the pump at work and increase the pressure in the receiver.

What I claim as my invention, and desire to secure by Letters Patent, is—

1. The within-described process of vulcanizing or curing wood, which consists in subjecting the wood, in a close receiver, to heat and an air or gaseous pressure greater than the pressure of the atmosphere, and sufficient to prevent the volatilization of the liquid or fluid matters at the temperature employed, whereby the said liquid or fluid matters are retained and coagulated in the wood, and the wood cured and preserved, substantially as described.

2. As a new product, vulcanized wood, as described, having the natural juices and sap coagulated and retained as solid and antiseptic substances filling the pores, the said wood being a solid, dense, and uniform body, substantially as set forth.

LOUIS S. ROBBINS.

Witnesses:
S. F. SULLIVAN,
WM. A. POLLOCK.